(12) United States Patent
Tuman, II et al.

(10) Patent No.: US 9,254,767 B1
(45) Date of Patent: Feb. 9, 2016

(54) ADJUSTABLE HEADREST AND SEATBELT GUIDE RINGS

(71) Applicant: Sears Manufacturing Co., Davenport, IA (US)

(72) Inventors: William W. Tuman, II, Muscatine, IA (US); Daniel J. Alexander, Blue Grass, IA (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 14/492,229

(22) Filed: Sep. 22, 2014

(51) Int. Cl.
*B60N 2/48* (2006.01)
*B60R 22/26* (2006.01)
*B60R 22/20* (2006.01)
*B60R 22/18* (2006.01)

(52) U.S. Cl.
CPC .............. *B60N 2/4808* (2013.01); *B60R 22/20* (2013.01); *B60R 22/26* (2013.01); *B60R 2022/1818* (2013.01)

(58) Field of Classification Search
CPC ...... B60N 2/4808; B60R 22/20; B60R 22/26; B60R 2022/1818
See application file for complete search history.

(56) References Cited

U.S. PATENT DOCUMENTS

| | | | | |
|---|---|---|---|---|
| 4,348,037 A | * | 9/1982 | Law et al. | 280/733 |
| 4,652,053 A | * | 3/1987 | Mikami | 297/484 |
| 4,915,447 A | * | 4/1990 | Shovar | 297/284.11 |
| 5,330,228 A | * | 7/1994 | Krebs et al. | 280/801.2 |
| 6,293,588 B1 | * | 9/2001 | Clune | 280/808 |
| 6,305,713 B1 | * | 10/2001 | Pywell et al. | 280/801.1 |
| 6,425,602 B1 | * | 7/2002 | Al-Amin et al. | 280/730.2 |
| 6,547,333 B2 | * | 4/2003 | Parenteau et al. | 297/397 |
| 6,811,186 B1 | | 11/2004 | Fraley et al. | |
| 8,016,318 B2 | * | 9/2011 | Nezaki | 280/733 |
| 8,419,127 B1 | | 4/2013 | Wilhelm et al. | |
| 8,523,229 B1 | | 9/2013 | Kohlndorfer | |
| 9,004,606 B2 | * | 4/2015 | Bostrom et al. | 297/468 |
| 2002/0171233 A1 | * | 11/2002 | Grace | B60R 21/18 280/733 |
| 2003/0160498 A1 | * | 8/2003 | Boelstler et al. | 297/483 |
| 2004/0113411 A1 | * | 6/2004 | Djien | 280/808 |
| 2004/0113412 A1 | * | 6/2004 | Go | 280/808 |
| 2005/0121897 A1 | * | 6/2005 | Elizondo et al. | 280/801.1 |
| 2006/0017274 A1 | * | 1/2006 | Bronner et al. | 280/801.1 |

FOREIGN PATENT DOCUMENTS

| | | |
|---|---|---|
| DE | 4010452 A1 * | 10/1991 |
| DE | 19851650 A1 * | 5/2000 |

* cited by examiner

*Primary Examiner* — Rodney Mintz
(74) *Attorney, Agent, or Firm* — Lane & Waterman LLP

(57) ABSTRACT

An adjustable headrest and integrated seat belt D-ring for a seat including a height adjustable headrest, D-rings on either side of the headrest and attached to the headrest for unitary movement with the headrest, slots in the D-rings configured to receive harness webbing which are also slanted to accommodate spacing adjustment between the two harnesses fed through the slots.

14 Claims, 7 Drawing Sheets

ADJUSTABLE HEADREST AND SEATBELT GUIDE RINGS

BACKGROUND

The present disclosure relates to a headrest for a seat and more particularly, to a height-adjustable headrest with integrated seatbelt guide rings for use in a vehicle.

Most vehicle seats are equipped with a headrest and seat belts. Both headrests and seat belts play an important role in the safety of the vehicle passenger. Headrests, when properly positioned, can prevent whiplash and other neck injuries in the event of a collision. Properly positioned seat belts are designed to secure the seat occupant against harmful movement that can occur as a result of a collision or other forces exerted on the passenger. To allow for proper positioning, headrests are often height-adjustable to accommodate varying heights of passengers. Additionally, many seat belts often include a mechanism to allow for adjustability to accommodate the shoulder height of the passenger.

Off-road vehicles such as tractors and construction equipment often include a three-point harness safety belt instead of the lap and shoulder belt commonly found in automobiles. In three-point harness arrangements, two guide rings or D-rings are generally located near the passenger's shoulders and the seat belt webbing is routed through the D-ring. The webbing is then secured by a buckle or other webbing lock mechanism in the passenger's lap area, while the other ends of the shoulder webbing are permanently secured to the back of the seat or the vehicle. To create a three-point harness, a lap belt is also used in connection with the shoulder webbing. The lap belt is typically adjustable depending on the girth of the passenger. However, in the typical arrangement, the shoulder webbing that is threaded through the b-rings generally cannot be adjusted according to the girth of the passenger. The varying girth of vehicle passengers without the ability to adjust the positioning of the shoulder webbing to accommodate those variances can create an ill-fitting and/or uncomfortable safety harness as well as a potential safety issue for the passenger.

There is a need, therefore, for guide rings that are height adjustable to accommodate varying passenger heights but that also allow adjustment of the shoulder webbing for varying girths of passengers.

SUMMARY

In one aspect, an adjustable headrest for a seat comprising a seat, a headrest, and two D-rings is provided. The D-rings are located on opposite sides of the headrest, and the D-rings and headrest are vertically adjustable with respect to the seat. Each D-ring contains a slot through which harness webbing can be received. The webbing is configured to securely attach to the seat back at one end. The other end is fed through the slots and is locked with a locking mechanism at the other end.

In another aspect, the slots are wider than the harness webbing and are slanted such that the outer edges are higher than the inner edges. This width and slant allows for adjustment of the harness webbing to widths between approximately 2 inches and 6 inches and more particularly between 2.5 inches and 5.6 inches.

In another embodiment, an adjustable headrest and harness system for use in a vehicle comprises a seat attached to a vehicle having a seat back and a seat bottom and configured for receiving a passenger, a headrest attached to the seat, wherein the headrest is vertically adjustable with respect to the seat, two D-rings, one positioned on each side of the headrest in between the seat and headrest where each D-ring further comprises a slot wherein each slot is angled such that the outside edges of each slot are higher than the inside edges of each slot, two strips of webbing, wherein one end of each strip is securedly attached to the back of the seat and the other end is threaded through the slot and secured to the seat bottom with a locking mechanism, and wherein the slots are approximately 1.55 inches wider than the strip of webbing and are positioned such that when the two strips of webbing are received in the slots at their innermost positions, the distance between the two strips of webbing is approximately 2.5 inches and when the two strips of webbing are received in the slots at their outermost positions, the distance between the two strips of webbing is approximately 5.6 inches, and a lap belt that integrates with the locking mechanism and two strips of webbing.

The above-described features and advantages, as well as others, will become more readily apparent to those of ordinary skill in the art by reference to the following detailed description and accompanying drawings. While it would be desirable to provide a headrest and D-ring apparatus that includes one or more of these advantageous features, the teachings disclosed herein extend to those embodiments which fall within the scope of the appended claims, regardless of whether they accomplish one or more of the above-mentioned advantages.

DETAILED DESCRIPTION

Figure 1:
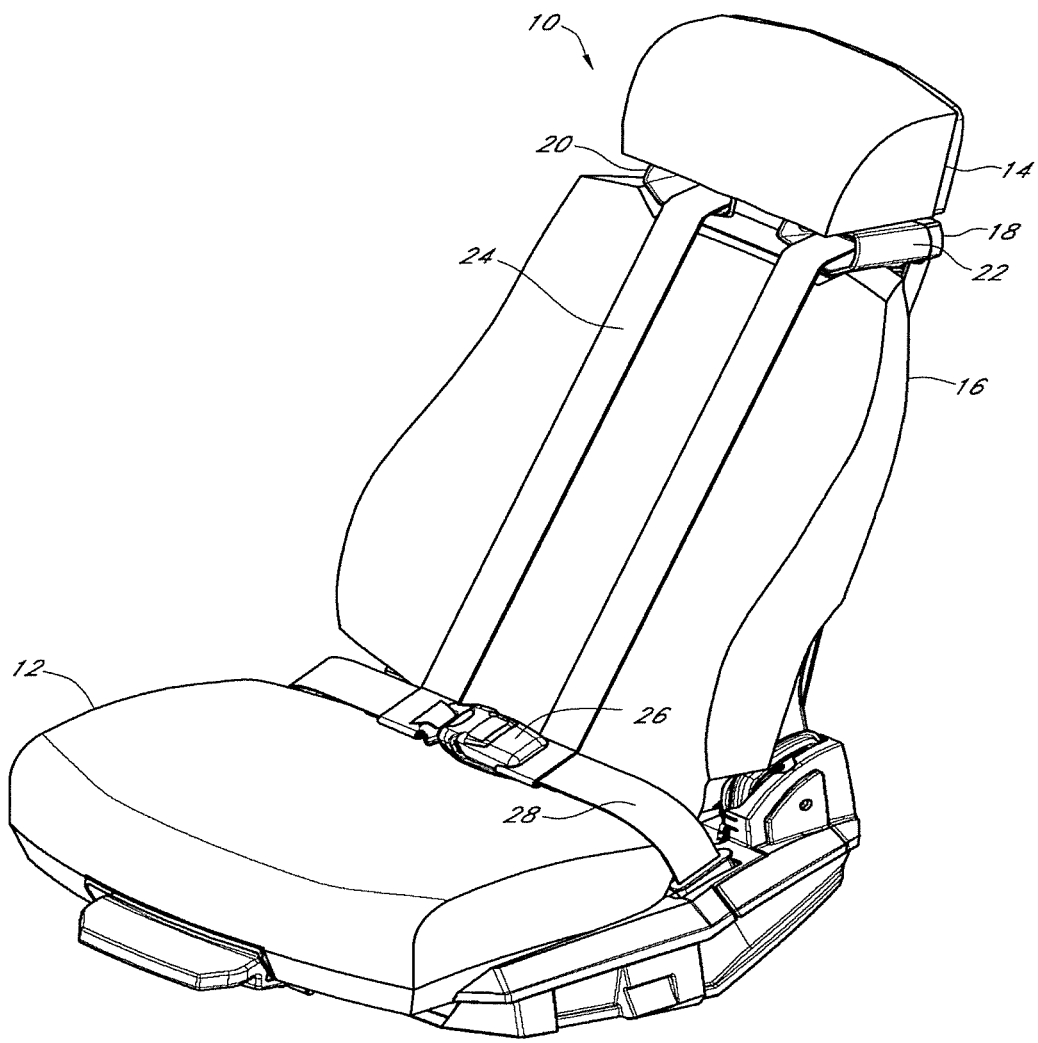
FIG. 1 is a front perspective view of an adjustable headrest and D-ring apparatus.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

One type of adjustable headrest with integrated d-rings 10 is shown in FIG. 1. The seat 12 can be any vehicle seat commonly known in the art and the details of which are shown solely for illustrative purposes. The seat 12 may be attached to the vehicle in any known manner and may incorporate the use of a suspension system or any other refinements commonly known in the art. The seat includes a headrest 14 which may be height-adjustable with respect to the seat back 16. That is, the headrest may be raised or lowered with respect to the seat back 16 using any means commonly known in the industry. Headrests are commonly attached to seat backs with guide rods (not shown) which allows for sliding adjustment of the height of the headrest. Such adjustment can also be motorized using a thread screw (not shown) as is commonly known in the art.

Figure 2:
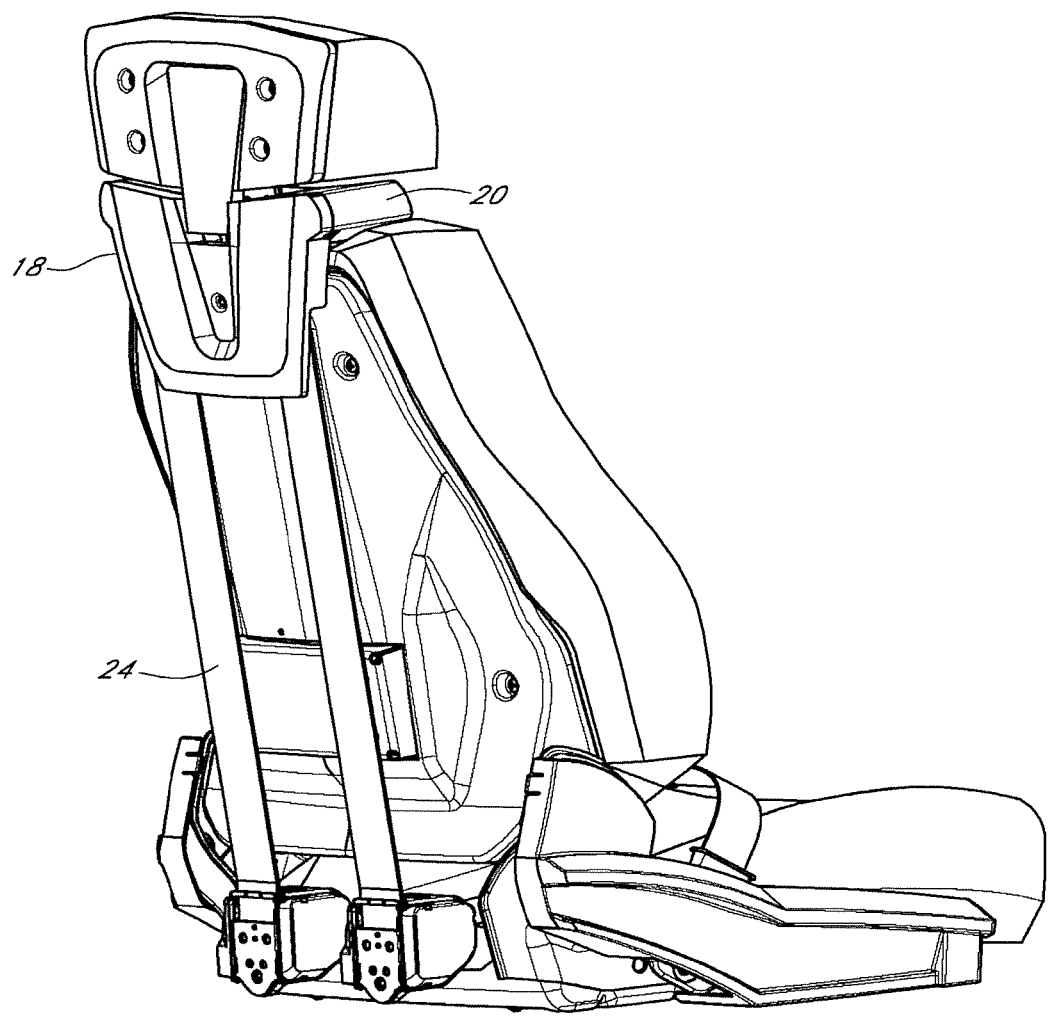
FIG. 2 is a rear perspective view of the apparatus shown in FIG. 1.

Referring now to FIGS. 1 and 2, a D-ring bracket 18 is shown which can be a generally v-shaped component as shown in FIG. 2 or any other suitable shape so long as the bracket includes two D-rings 20, 22 that extend over the top of the seat cushion as shown in FIG. 1. Shoulder webbing 24 is secured to the back of the seat 12 as shown in FIG. 2. The other ends of the shoulder webbing 24 are threaded through the D-rings as best shown in FIG. 1. The shoulder webbing 24 is then connected to a webbing lock mechanism 26. The webbing lock mechanism 26 can be any type of mechanism commonly used in the industry. The webbing lock mechanism can also be integrated with a lap belt 28 as shown in FIG. 1 as is also commonly known in the industry.

Figure 3A:
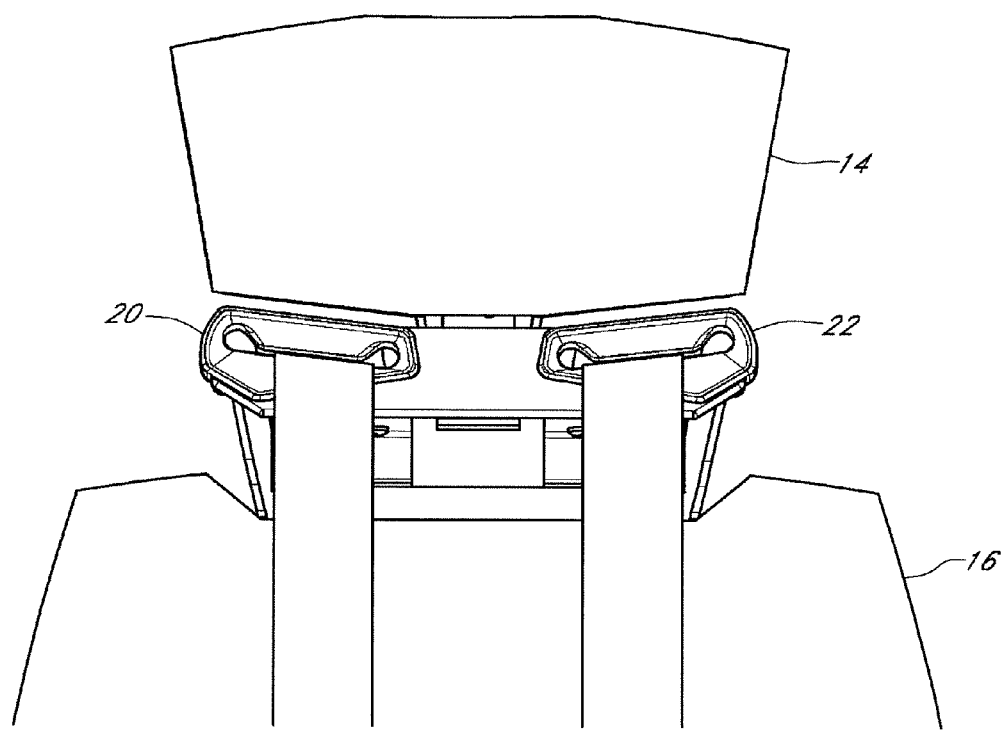
FIG. 3a is a front view of the adjustable headrest and D-ring apparatus shown in its fully raised position.
Figure 3B:
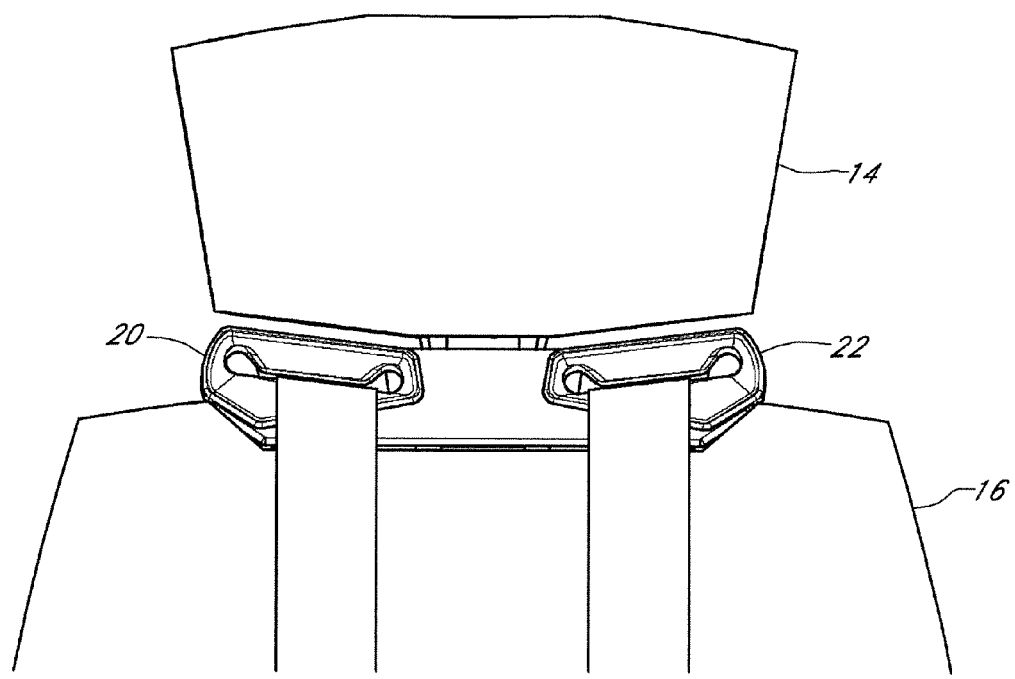
FIG. 3b is a front view of the adjustable headrest and D-ring apparatus shown in its fully lowered position.

Referring now to FIGS. 3a and 3b, the D-rings 20, 22 and the headrest 14 can be raised and lowered to accommodate the height of the passenger. As can be appreciated, the D-ring bracket 18 and headrest 14 are connected to one another such that they are both height adjustable as a single unit. That is, the headrest 14 and D-ring bracket 18 both move relative to the seat back 16 when adjusted. As described earlier, the headrest can be engaged with the seat back in any number of ways commonly known in the art such as with guideposts on which the headrest is slidably engaged and such adjustment can occur either manually or by the use of a motorized thread screw, or by any other commonly known mechanism suitable for such an application. FIG. 3a shows the headrest 14 and D-rings 20, 22 in a raised position such as would be used to accommodate a taller passenger and FIG. 3b shows the headrest 14 and D-rings 20, 22 in the lowermost position as would be suitable for a shorter passenger. The distance that the headrest 14 and D-rings 20, 22 can travel between the positions shown in FIGS. 3a and 3b is approximately 2-3 inches, but other ranges may be desirable in certain applications and therefore, the range of height adjustability may vary between applications.

Figure 4:
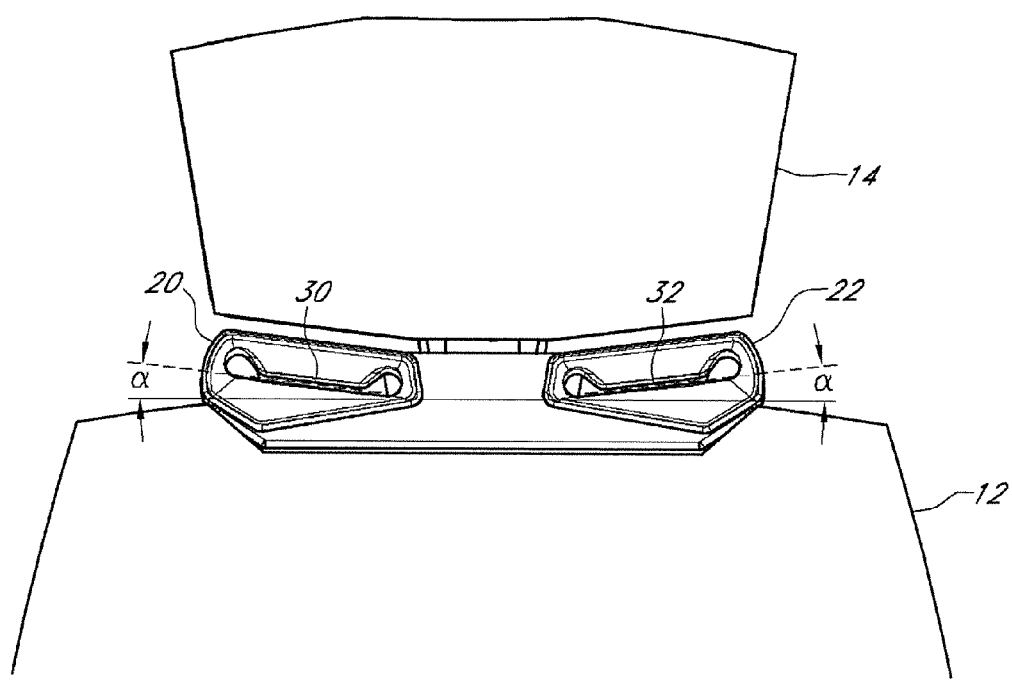
FIG. 4 is an enlarged front view of the headrest and D-ring apparatus shown in FIG. 1.
Figure 5A:
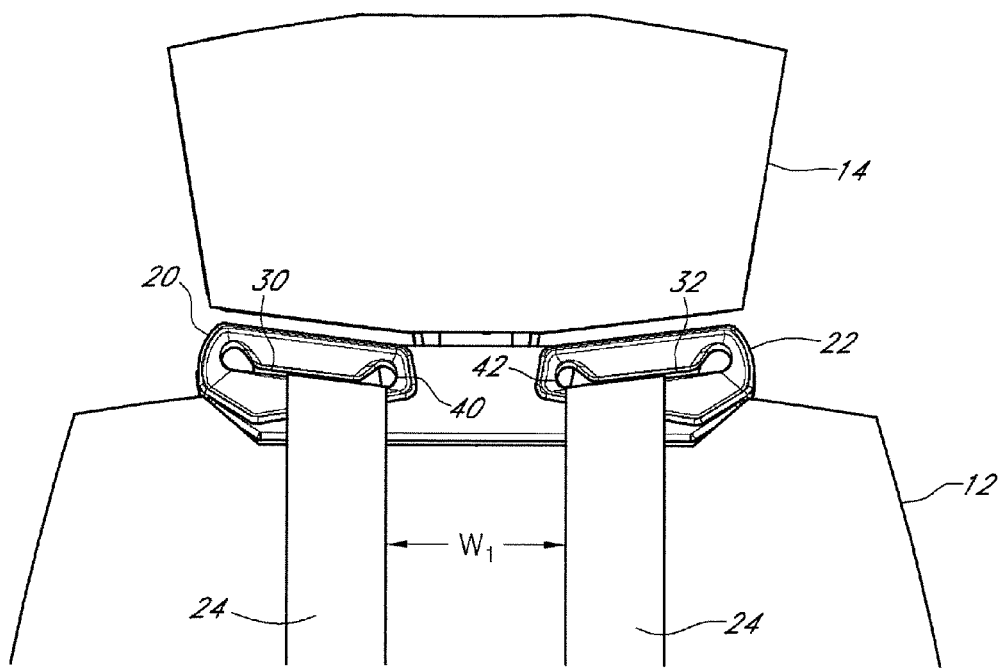
FIG. 5a is a front view of the adjustable harness shown with the harnesses at their nearest locations.
Figure 5B:
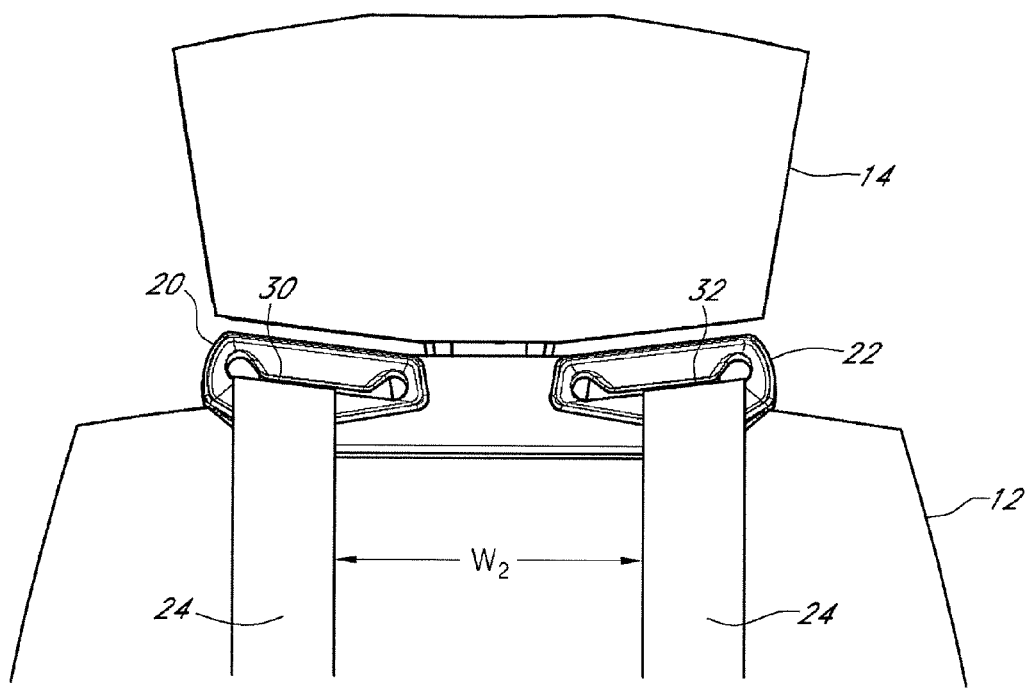
FIG. 5b is a front view of the adjustable harness shown with the harnesses at their distal locations.

Referring now to FIG. 4, the D-rings 20, 22 include slots 30, 32 through which the shoulder webbing 24 passes. Slots 30, 32 are angled with respect to a horizontal plane which can be the plane of the vehicle floor or the general plane of the seat bottom. In one embodiment, the angle $\alpha$ is approximately 7°. In other embodiments, the angle $\alpha$ can be between approximately 2° and 12° to achieve the objects of the invention. As best shown in FIGS. 5a and 5b, the slots 30 and 32 have a width that is greater than the width of the shoulder webbing 24. This allows the shoulder webbing 24 to move within the slots 30, 32. It can be appreciated that the shoulder webbing 24 can slide inwards for passengers with a smaller girth (FIG. 5a) and outwards for passengers with a larger girth (FIG. 5b). It can be appreciated that the shoulder webbing 24 can be adjusted in any number of positions within the slots 30, 32 to accommodate different sized passengers. Allowing the shoulder webbing 24 to be adjustable within the slots 30, 32 can provide a more comfortable harness for the passenger in addition to being safer for the passenger. In one embodiment, the distance $W_1$ between the two inner edges 40, 42 of slots 30, 32 is approximately 3 inches but can be between approximately 2.5 inches and 4 inches. It can be understood that when the shoulder webbing is moved outwards as shown in FIG. 5b, the distance between the shoulder webbing $W_2$ is approximately 5.6 inches but other ranges are contemplated by this invention including widths between 4 and 6 inches. By allowing the width between the shoulder webbing 24 to be adjustable relative to the girth of the passenger, it can be appreciated that the safety of the harness is also improved.

The foregoing detailed description of one or more embodiments of the adjustable headrest and D-rings has been presented herein by way of example and not limitation. It will be recognized that there are advantages to certain individual features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims.

The invention claimed is:

1. An adjustable headrest for a seat comprising
   a seat;
   a headrest;
   two D-rings attached to the headrest on opposite sides, each D-ring comprising a slot therein, wherein the headrest and D-rings are configured to adjust vertically relative to the seat as a single unit;
   two strips of harness webbing, each configured to be securely attached behind the seat at one end, and received by one of the slots and secured with a locking mechanism at another end; and
   wherein the slots of the D-rings are angled with respect to a horizontal axis such that the slots are angled upwardly from an innermost point at an angle between approximately 2 and 12 degrees.

2. The headrest of claim 1, wherein the angle of the slots relative to the horizontal axis is 7 degrees.

3. The headrest of claim 2, wherein the slots have a width such that the slots allow the webbing received therein to be adjustable within the width of the slots.

4. The headrest of claim 3, wherein when each strip of webbing is positioned in a respective said slot at the innermost point, the distance between the strips is between 2 and 4 inches.

5. The headrest of claim 4, wherein the distance between the webbing, when each strip of the webbing is positioned in the slots at the innermost point is 2.5 inches.

6. The headrest of claim 3, wherein the distance between the webbing, when each strip of the webbing is positioned in the slots at a position farthest from the innermost point, is between 4 and 6 inches.

7. The headrest of claim 6, wherein the distance between the webbing, when each strip of the webbing is positioned in the slots at a position farthest from the innermost point is 5.6 inches.

8. An adjustable headrest and harness restraint system comprising
   a seat having a seat bottom and a seat back and configured to support a passenger;
   a headrest mounted to the seat, wherein the headrest is vertically adjustable with respect to the seat back;
   a D-ring bracket attached to the headrest and comprising two D-rings, wherein the D-rings are positioned on either side of the headrest;
   a slot formed in each D-ring configured to receive a strip of harness webbing wherein each strip of harness webbing is securely attached to the seat at one end, is received through the D-ring slot, and is attached to the seat bottom by a locking mechanism at another end; and
   wherein the slots are each angled downwardly toward the headrest at an angle relative to a horizontal axis that is parallel to the seat bottom, between 2 and 12 degrees.

9. The system of claim 8, wherein the angle is 7 degrees.

10. The system of claim 9, wherein the slots are wider than the harness webbing.

11. The system of claim 10, wherein the slots are approximately 1.55 inches wider than the harness webbing.

12. The system of claim 11 wherein a distance between the strips of harness webbing when each strip of harness webbing is positioned in a respective said slot is adjustable between approximately 2 inches and 6 inches.

13. The system of claim 12, wherein the distance between the two strips of harness webbing received by the slots is adjustable between 2.5 inches and 5.6 inches.

14. An adjustable headrest and harness system for use in a vehicle comprising:
- a seat attached to a vehicle having a seat back and a seat bottom and configured for receiving a passenger;
- a headrest attached to the seat, wherein the headrest is vertically adjustable with respect to the seat;
- two D-rings, one positioned on each side of the headrest in between the seat and headrest, each D-ring further comprising a slot wherein each slot further comprises an innermost edge and an outermost edge wherein each slot is slanted such that the outermost edges of each slot are higher than the innermost edges of each slot;
- two strips of webbing, wherein one end of each strip is securely attached to the back of the seat and another end is threaded through the slot and secured to the seat bottom with a locking mechanism, and wherein the slots are approximately 1.55 inches wider than the strip of webbing and are positioned such that when the two strips of webbing are received in the slots and positioned along the innermost edge, a distance between the two strips of webbing is approximately 2.5 inches and when the two strips of webbing are received in the slots and positioned along the outermost edge, the distance between the two strips of webbing is approximately 5.6 inches; and
- a lap belt that integrates with the locking mechanism and two strips of webbing.

\* \* \* \* \*